United States Patent [19]

Komanduri et al.

[11] Patent Number: 4,588,332
[45] Date of Patent: * May 13, 1986

[54] SELF-SHARPENING TOOL CONSTRUCTIONS HAVING CHIP-GROOVES

[75] Inventors: Ranga Komanduri; William R. Reed, Jr., both of Schenectady, N.Y.

[73] Assignee: General Electric Company, Schenectady, N.Y.

[*] Notice: The portion of the term of this patent subsequent to Sep. 10, 2002 has been disclaimed.

[21] Appl. No.: 438,685

[22] Filed: Nov. 3, 1982

[51] Int. Cl.$^4$ .................................................. B23B 27/22
[52] U.S. Cl. ....................................................... 407/114
[58] Field of Search ........ 76/101 R, 101 A, DIG. 11; 30/350; 407/119, 2-6, 100, 113-116, 118, 120; 409/66; 75/240, 241, 242; 428/571, 600

[56] References Cited

U.S. PATENT DOCUMENTS

| | | | |
|---|---|---|---|
| 1,769,222 | 7/1930 | Ignatieff | 407/116 |
| 2,370,273 | 2/1945 | Ulliman | 407/116 |
| 3,188,717 | 6/1965 | Heinlein | 407/113 |
| 3,341,920 | 9/1967 | Kelm | 407/113 |
| 3,343,431 | 9/1967 | Boyer | 407/113 |
| 3,344,496 | 10/1967 | Patkay | 407/114 |
| 3,369,283 | 2/1968 | Colding | 407/113 |
| 3,416,209 | 12/1968 | Contrucci | 407/113 |
| 3,520,041 | 7/1970 | Shephard | 407/117 |
| 3,564,683 | 2/1971 | Schedler et al. | 407/119 |
| 3,618,654 | 11/1971 | Meserue | 407/120 |
| 3,745,623 | 7/1973 | Wentorf | 407/114 |
| 3,947,937 | 4/1976 | Hertel | 407/114 |
| 4,111,589 | 9/1978 | Goeke | 407/114 |
| 4,248,553 | 2/1981 | Kraemer | 407/114 |
| 4,294,566 | 10/1981 | Boone | 407/114 |
| 4,449,864 | 5/1984 | Haque et al. | 82/1 C |

FOREIGN PATENT DOCUMENTS

| | | | |
|---|---|---|---|
| 453004 | 11/1948 | Canada | 407/116 |
| 877531 | 5/1953 | Fed. Rep. of Germany | 407/116 |
| 1070898 | 12/1959 | Fed. Rep. of Germany | 407/115 |
| 210706 | 8/1960 | Fed. Rep. of Germany | 407/116 |
| 197707 | 3/1977 | U.S.S.R. | 407/116 |
| 709258 | 1/1980 | U.S.S.R. | 407/116 |

OTHER PUBLICATIONS

Translation of German 1070898.
Production Technology Abroad by Dr. M. Barash, Manufacturing Engineering, Mar. 1980.
Moscow Institute Instruments with Shortened Surfaces, Trudy #34, 1961, pp. 120–127.
The Wear of Forming Tools with a Shortened Back Surface, Vestink Mashinostrogeniya 1979, No. 5, pp. 54–55.
Heat Build Up on the Wearing Surfaces of Cutting Tools, 1963, Journal of Mechanical Engineering.

Primary Examiner—Francis S. Husar
Assistant Examiner—Jerry Kearns
Attorney, Agent, or Firm—James Magee, Jr.; James C. Davis, Jr.

[57] ABSTRACT

An improved self-sharpening refractory metal cutting tool presenting an overhanging cutting element of width about equal to the depth of the cut to be taken and of maximum thickness equal to tolerable tool flank wear is provided with a plurality of grooves at least on the rake face of the over-hanging cutting portion, or cutting element, to guide the chip leaving the workpiece and to reduce the cutting forces. These chip-grooves are utilized in sequence as the cutting element is consumed lengthwise during the machining operation.

26 Claims, 8 Drawing Figures

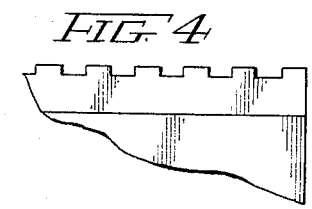
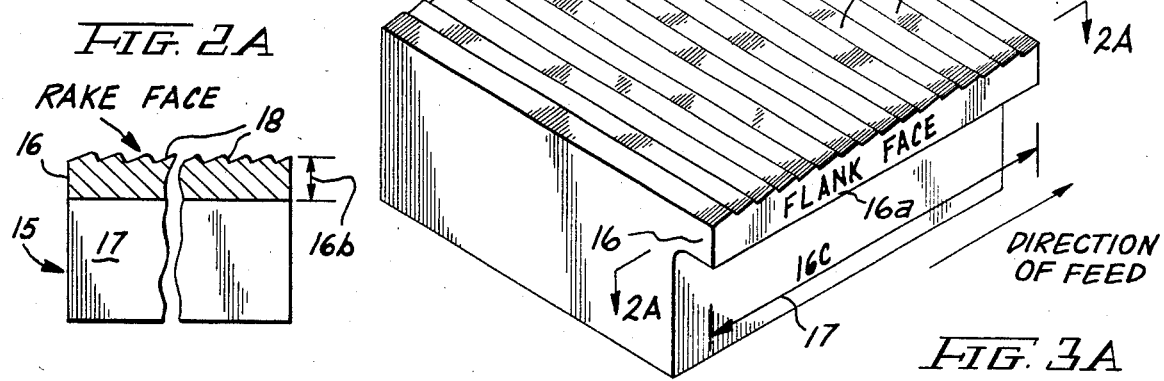
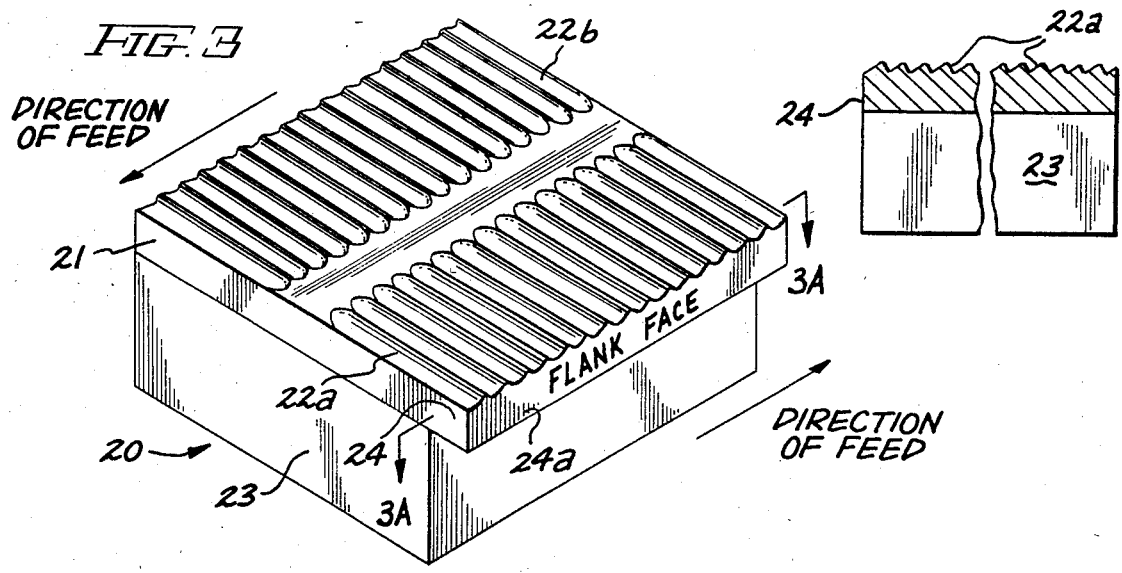

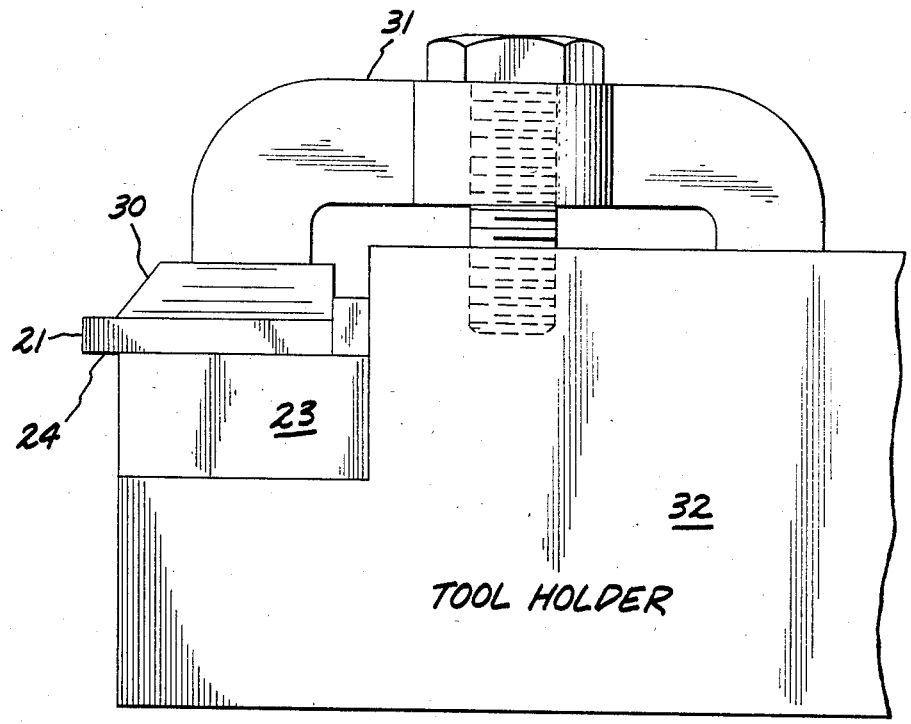

SELF-SHARPENING TOOL CONSTRUCTIONS HAVING CHIP-GROOVES

The present invention relates generally to improvements in certain cutting tool insert constructions, which are self-sharpening and have special utility in the machining of hard-to-machine metallic articles. The latter cutting tool inserts "each embodying a consumable overhanging ledge are the prior invention of another and" are described in U.S. patent application Ser. No. 331,341-Lee et al. filed Dec. 16, 1981, which application is assigned to the assignee of the instant invention and is incorporated by reference.

"Self-sharpening" as the term is used in Ser. No. 331,341 and in this specification and the appended claims means and refers to the unique characteristic of retention of cutting ability of the cutting element of the tool insert as it is consumed lengthwise during the cutting operation. Thus, unlike heretofore conventional milling and turning cutters, the self-sharpening tool insert constructions of this invention do not require regrinding to sharpen them so that catastrophic escalation of the cutting force does not occur as workpiece material removal proceeds.

The terms "integral" and "integrally-formed" as used in Ser. No. 331,341 and in this application for certain of the tool constructions disclosed herein and in the appended claims mean and refer to a unitary body providing both the cutting and support functions as distinguished from a composite of articles separately formed to independently carry out these functions and thereafter temporarily or permanently joined, bonded or otherwise secured together to carry on a machining operation.

A prime advantage of consumable tool insert constructions disclosed and claimed in Ser. No. 331,341 is the capability afforded thereby for operation at higher speeds than with conventional tool inserts. This is particularly important, when machining titanium alloys. Occasionally, however, during the high speed machining of titanium alloys with these tool inserts sparking has occurred. Investigation has shown that in those incidences in which sparking has occurred, thin secondary chips were being formed and these secondary chips were reacting with the air. Manifestly, it would be desirable to prevent formation of secondary chips in order to increase the safety of high speed machining of reactive metals such as titanium alloys.

One solution to this problem is described and claimed in our copending U.S. patent application Ser. No. 438,684—Komanduri and Reed, filed Nov. 3, 1982, and assigned to the assignee of this application. Ser. No. 438,684 is incorporated herein by reference.

DESCRIPTION OF THE INVENTION

The invention lies in the elimination of secondary chip formation which can occur intermittently during machining with self-sharpening tool insert construction comprising in combination a consumable longitudinally-extending cutting element and means for supporting such cutting element. The consumable cutting element of substantially uniform thickness (i.e. about 20 mils to about 80 mils) overhangs the support means such that it presents the flank face for the tool insert a substantially uniform distance (i.e. about 20 mils to about 80 mils) from the support means. This invention in its simplest terms comprises the provision of a plurality of longitudinally-extending chip-grooves formed in the race face portion of the cutting element, such chip-grooves extending generally perpendicular to the flank face on the cutting element. This series of chip-grooves are utilized one by one in sequence to quide the chip as the cutting element is consumed along its length.

If desired, the solution set forth in Ser. No. 438,684 can be combined with the chip-grooves of this invention in that the rake face (including the chip-grooves) can be provided with a coating to decrease the likelihood of chemical or physical interaction between the rake face and the workpiece.

BRIEF DESCRIPTION OF THE DRAWINGS

FIG. 2 is a schematic-three dimensional representation showing the application of this invention to an integral tool insert with a consumable cutting element;

FIG. 2A is a sectional view taken on line 2A—2A of FIG. 2;

FIG. 3 is a schematic three-dimensional representation of another embodiment of this invention applied to the plate and support assembly version of the consumable tool;

FIG. 3A is a sectional view taken on line 3A—3A of FIG. 3;

FIG. 4 is a partial view in elevation of the flank face of a consumable cutting element showing the contour of still a third embodiment of this invention and FIG. 5 is a schematic side view in elevation of a tool insert of this invention and supporting block therefor clamped in a tool holder.

MANNER AND PROCESS OF MAKING AND USING THE INVENTION

Figure 1A:
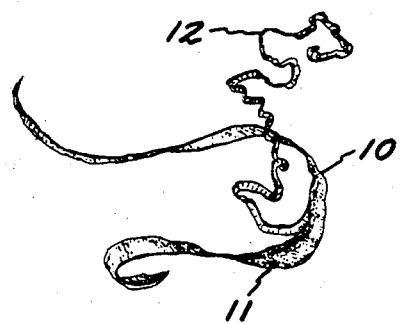
FIG. 1A is a photograph of a metal chip produced during turning of a titanium alloy workpiece by the use of a consumable tool having a flat rake face, the secondary chip formed is shown therein.
Figure 1B:
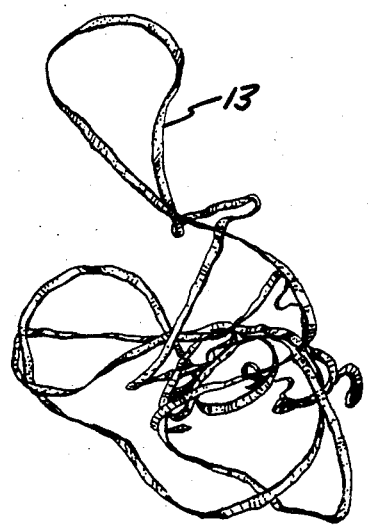
FIG. 1B is a photograph of a metal chip produced during turning of the same titanium alloy at the same speed using a consumable tool made of the same material, but embodying the improvement of this invention.

FIG. 1A displays an actual chip machined from a titanium alloy using the consumable tool with a flat rake face. As is shown therein, chip 10 is subdivided into a primary chip 11 and a secondary chip 12 for part of its length. It is the generation of such secondary chips that this invention is intended to preclude. As is seen in FIG. 1B, when the same machining operation (i.e. same workpiece material, same speed, same feed, etc.) is carried on using the consumable tool embodying this invention, the secondary chips do not form in chip 13.

A first embodiment (i.e. the integral construction) of this invention is shown in FIG. 2. The overall insert 15 is in the general configuration of a hexahedron with a portion removed from one side to define an integrally-formed ledge 16 extending from a supporting face 17 and presenting flank face 16a. Ledge 16 is in effect a flange, as it extends a uniform distance from face 17 and provides an upper edge of tool insert 15. The upper surface of ledge 16 presents or provides the rake face for the cutting element, which is of uniform cross-sectional size and shape throughout its length. Instead of presenting a flat rake face, according to this embodiment of the invention a series of longitudinally-extending chip-grooves 18 are formed in the rake face of cutting element 16 extending generally perpendicular to flank face 16a. This particular chip-groove configuration viewed in cross-section comprises two inclined planes, one significantly wider than the other and intersecting to form a trough. In the preferred construction in which the cutting element is 50 mils thick, the horizontal dimension of the chip-groove would be about 30 mils and its depth would be about 5 mils. Although chip-grooves 18 are shown extending all the way across the top face of insert 15, the viable portion of each chip-groove is that portion formed on the rake face of ledge 16.

The predimensioned overhanging consumable ledge, or flange, will project to dispose its flank face at a distance in the range of from 20 mils to 80 mils (preferably from 30 mils to 50 mils) from the support face and will have a uniform maximum thickness 16b providing a maximum flank dimension in the range of from 20 mils to 80 mils (preferably from 30 mils to 50 mils). The selection of the particular dimensions for the overhanging consumable portion (i.e. the cutting element) will depend upon the strength of the material of which the flange is made, the cut to be made, the expected tool life, etc. However, as a practical matter, the longitudinal length 16c of the cutting element should be at least ¼ inch long.

It will be understood that the self-sharpening tool insert (of whatever refractory or other material it may be made) is producible either directly in its ultimate shape as by cold pressing and then sintering or indirectly by producing first an oversized tool blank and then carrying out a shaping operation in which the tool blank is cut or trimmed to provide the requisite overhanging consumable cutting element and the chip-grooves.

FIG. 3 displays the application of a second embodiment of this invention to a different consumable cutting tool insert. In the assembly 20 the portion providing the longitudinally-extending consumable cutting element (i.e. the tool insert) is preferably in the shape of flat plate 21 (e.g. a prism or cylinder) of substantially uniform thickness with substantially parallel opposite major surfaces. As in the previous embodiment, a series of chip-grooves 22a and 22b are formed in the upper surface, these chip-grooves being arcuate in transverse cross-section. As is shown in FIG. 5 plate 21 is placed upon support block 23 and held with chip breaker 30 by clamp 31 in tool holder 32 with a portion of the plate 21 overhanging support block 23 to provide the properly dimensioned ledge, or flange 24 (i.e. the cutting element portion), to be consumed in the lengthwise direction thereof during use.

The flank dimension of consumable portion 24 is set by the thickness (in the range of 20 mils to 80 mils with a preferred range of 30 mils to 50 mils) of the tool insert 21 and the depth of cut (i.e. locating the flank face 24a in the range of 20 mils to 80 mils, with a preferred range of 30 mils to 50 mils, from support 23) is set by the extent of overhang of the tool insert in the clamped position. Various arcuate shapes can be set for the cross-section of chip-grooves 22a, 22b. However, in those instances in which this shape is not symmetrical, i.e. compound arcs of different radii are used (as shown in FIG. 3), the edge of the chip-groove presenting the arcuate portion of greater radius normally is used as the leading edge (i.e. this edge encounters the chip first during machining as the tool insert is fed into the workpiece).

Still another embodiment is shown in FIG. 4, the chip-grooves 30 being in the shape of shallow rectangular slots spaced apart by narrow lands.

In using each embodiment of the tool insert configuration of this invention in machining (i.e. turning or milling), the tool insert is positioned in accordance with preferred practice of the method of Ser. No. 331,341 with about 1° clearance angle or less between the cutting portion or flange of the tool and the workpiece such that, when the leading end of the top front edge of the cutting element is in contact with the workpiece, the trailing end of the top front edge of the cutting element is out of contact with the workpiece to provide the clearance angle. In this high-speed cutting operation the tool insert is advanced continuously in the direction shown in FIGS. 2 and 3 in contact with the workpiece (not shown). In this operation, the cutting element is more or less continuously worn away along its length as machining proceeds so that the flange disappears progressively until the cut is completed or until the flange is no longer available. Functionally, as the cutting proceeds, the length of the projecting flange executes a roughing cut and a continually advancing short length of the sharp top front edge of the flange (where contact is made with the workpiece at the apex of the 1° angle mentioned) executes a finishing cut immediately thereafter. If a multi-flange tool such as tool insert 21 is used, when one flange has been consumed, the tool may be remounted in the machine tool holder to present a fresh cutting element into contact with the workpiece to continue the material removal operation.

During the machining operation the chip leaving the workpiece encounters a chip-groove (a fresh chip-groove or one partially consumed along with the cutting element) and is guided thereby with the result that the formation of secondary chips is obviated and the chips are disposed of efficiently. Although a determination has not been made at this time, it is expected that the provision of chip-grooves according to this invention will significantly reduce the forces applied to the tool insert and thereby increase tool life. An illustrative example is set forth below.

EXAMPLE

A flat plate 30 mils thick of Carboloy ® tungsten carbide Grade 883 was clamped in place with a uniform overhang (i.e. depth of cut) of 30 mils, a back rake angle of −5°, a side rake angle of −5°, and clearance angle of 1° with the workpiece. The workpiece, a solid cylinder of titanium (6Al—4V) was rotated at 600 surface feet per minute in a Lodge and Shipley lathe. The feed was 0.009 inch. As machining progressed thin secondary chips were found to form periodically, which reacted with air and caused occasional sparks.

When the flat tungsten carbide plate was replaced with a plate of the same material, dimensions and manner of support having trough-shaped chip-grooves formed in its upper surface (as illustrated in FIG. 2) and the machining was carried on as described, secondary chip formation ceased.

What we claim as new and desire to secure by Letters Patent of the United States is:

1. In a cutting tool arrangement in which a tool insert of refractory material is rigidly held in a tool holder, said tool holder being adjustably mounted so as to bring said tool insert into contact with a metal workpiece to alter the shape thereof by the removal of metal therefrom; said tool insert comprising in combination a longitudinally-extending cutting element extending along at least one side of said tool insert to provide flank and rake faces for said tool insert and means for supporting said cutting element formed integrally therewith; said cutting element (a) overhanging said support means to present the flank face of said tool insert a substantially uniform distance in the range of from 20 mils to 80 mils from said support means, (b) having a maximum thickness in the range of from 20 mils to 80 mils, (c) being of substantially uniform transverse cross-section along said length and (d) being progressively consumed along the length thereof during use of said tool insert, the improvement wherein said rake face of said cutting element is modified by the presence of a plurality of longitudinally-extending chip-grooves formed in sequence in said rake face, said chip-grooves extending generally perpendicular to said flank face of said cutting element.

2. The improvement recited in claim 1 wherein each of the chip-grooves is arcuate in cross-section.

3. The improvement recited in claim 2 wherein adjacent chip-grooves are substantially contiguous.

4. The improvement recited in claim 1 wherein each of the chip-grooves is defined predominately by a pair of planar surfaces.

5. The improvement recited in claim 4 wherein adjacent chip-grooves are substantially contiguous.

6. The improvement recited in claim 1 wherein each of the chip-grooves is generally rectangular in cross-section and adjacent chip-grooves are separated by flat rake face surface area.

7. The improvement recited in claim 1 wherein the distance of the flank face from the support means is from about 30 mils to about 50 mils and the maximum thickness of said cutting element is from about 30 mils to about 50 mils.

8. In a cutting tool arrangement in which a tool insert of refractory material is rigidly held in a tool holder, said tool holder being adjustably mounted so as to bring said tool insert into contact with a metal workpiece to alter the shape thereof by the removal of metal therefrom; said tool insert being a flat plate of substantially uniform thickness in the range of from 20 mils to 80 mils; said plate being fixedly disposed on a separate support therefor in overhanging relationship therewith to define a cutting element portion of said plate said cutting element portion providing flank and rake faces for said tool insert, said flank face of said cutting element portion being located a substantially uniform distance in the range of from 20 mils to 80 mils from said support, said cutting element portion (a) having a maximum thickness in the range of from 20 mils to 80 mils and (b) being progressively consumed along the length thereof during use, the improvement wherein said rake face of said cutting element portion is modified by the presence of a plurality of longitudinally-extending chip-grooves formed in sequence in said rake face of said cutting element portion, said chip-grooves extending generally perpendicular to said flank face of said cutting element portion.

9. The improvement recited in claim 8 wherein the substantially uniform thickness of the plate is in the range of from about 30 mils to about 50 mils.

10. The improvement recited in claim 8 wherein each of the chip-grooves is arcuate in cross-section.

11. The improvement recited in claim 10 wherein adjacent chip-grooves are substantially contiguous.

12. The improvement recited in claim 8 wherein adjacent chip-grooves are substantially contiguous.

13. The improvement recited in claim 8 wherein each of the chip-grooves is generally rectangular in cross-section and adjacent chip-grooves are separated by flat rake face surface area.

14. The improvement recited in claim 8 wherein the distance of the flank face from the support means is from about 30 mils to about 50 mils and the maximum thickness of said cutting element is from about 30 mils to about 50 mils.

15. In the construction of a cutting tool insert of refractory material, said tool insert comprising in combination a longitudinally-extending cutting element extending along at least one side of said tool insert to provide flank and rake faces for said tool insert and means for supporting said cutting element formed integrally therewith; said cutting element (a) overhanging said supporting means to present the flank face of said tool insert a substantially uniform distance in the range of from 20 mils to 80 mils from said support means, (b) having a maximum thickness in the range of from 20 mils to 80 mils, (c) being of substantially uniform transverse cross-section along said length and (d) being progressively consumed along the length thereof during use of said tool insert, the improvement wherein said rake face of said cutting element is modified by the presence of a plurality of longitudinally-extending chip-grooves formed in sequence in said rake face, said chip-grooves extending generally perpendicular to said flank face of said cutting element.

16. The improvement recited in claim 15 wherein each of the chip-grooves is arcuate in cross-section.

17. The improvement recited in claim 16 wherein adjacent chip-grooves are substantially contiguous.

18. The improvement recited in claim 15 wherein adjacent chip-grooves are substantially contiguous.

19. The improvement recited in claim 15 wherein each of the chip-grooves is generally rectangular in cross-section and adjacent chip-grooves are separated by flat rake face surface area.

20. The improvement recited in claim 15 wherein the distance of the flank face from the support means is from about 30 mils to about 50 mils and the maximum thickness of said cutting element is from about 30 mils to about 50 mils.

21. In a cutting tool arrangement in which a tool insert of refractory material is rigidly held in a tool holder, said tool holder being adjustably mounted so as to bring said tool insert into contact with a metal workpiece to alter the shape thereof by the removal of metal therefrom, said tool insert being a multi-sided body having as at least one side thereof a longitudinally-extending portion of substantially uniform thickness in the range of from 20 mils to 80 mils, said tool insert being fixedly disposed in said tool holder on a separate support therefor with said portion disposed in overhanging relationship with said support to define a cutting element of substantially uniform transverse cross-section along said length, said cutting element providing flank and rake faces for said tool insert, said flank face being located at a substantially uniform distance in the range of from 20 mils to 80 mils from said support, said cutting element (a) having a maximum thickness in the range of from 20 mils to 80 mils and (b) being progressively consumed along the length thereof during use, the improvement wherein said rake face of said cutting element is modified by the presence of a plurality of longitudinally-extending chip-grooves formed in sequence in said rake face of said cutting element, said chip-grooves extending generally perpendicular to said flank face of said cutting element.

22. The improvement recited in claim 21 wherein each of the chip-grooves is arcuate in cross-section.

23. The improvement recited in claim 22 wherein adjacent chip-grooves are substantially contiguous.

24. The improvement recited in claim 21 wherein adjacent chip-grooves are substantially contiguous.

25. The improvement recited in claim 21 wherein each of the chip-grooves is generally rectangular in cross-section and adjacent chip-grooves are separated by flat rake face surface area.

26. The improvement recited in claim 21 wherein the distance of the flank face from the separate support is from about 30 mils to about 50 mils and the maximum thickness of said cutting element is from about 30 mils to about 50 mils.

* * * * *